(12) United States Patent
Kienzle et al.

(10) Patent No.: US 7,619,581 B2
(45) Date of Patent: Nov. 17, 2009

(54) PARABOLIC AERIAL WITH A CONICAL DIFFUSION DISC FOR FILL LEVEL RADAR

(75) Inventors: Klaus Kienzle, Zell a. H. (DE); Fritz Lenk, Schiltach (DE); Josef Fehrenbach, Haslach i.K. (DE)

(73) Assignee: Vega Grieshaber KG, Wolfach (DE)

( * ) Notice: Subject to any disclaimer, the term of this patent is extended or adjusted under 35 U.S.C. 154(b) by 371 days.

(21) Appl. No.: 11/580,629

(22) Filed: Oct. 12, 2006

(65) Prior Publication Data

US 2009/0262009 A1 Oct. 22, 2009

Related U.S. Application Data

(60) Provisional application No. 60/726,947, filed on Oct. 14, 2005.

(30) Foreign Application Priority Data

Oct. 14, 2005 (DE) ...................... 10 2005 049 242

(51) Int. Cl.
*H01Q 19/14* (2006.01)
(52) U.S. Cl. ..................... 343/840; 343/775; 343/779; 343/781 R
(58) Field of Classification Search ................. 343/775, 343/779, 781 R, 840, 841, 915
See application file for complete search history.

(56) References Cited

U.S. PATENT DOCUMENTS

| | | | |
|---|---|---|---|
| 3,696,436 A | 10/1972 | Yokoi et al. | |
| 5,033,833 A * | 7/1991 | Brown | 359/728 |
| 5,907,310 A * | 5/1999 | Seewig et al. | 343/786 |
| 5,926,152 A * | 7/1999 | Schneider | 343/915 |
| 6,847,669 B2 * | 1/2005 | Perner | 372/50.1 |
| 6,867,929 B2 * | 3/2005 | Lopez-Hernandez et al. | 359/726 |
| 7,081,863 B2 * | 7/2006 | Inasawa et al. | 343/781 CA |
| 2006/0005621 A1 * | 1/2006 | Lenk | 73/290 V |
| 2006/0017640 A1 | 1/2006 | Kienzle et al. | |

FOREIGN PATENT DOCUMENTS

| | | |
|---|---|---|
| EP | 1128468 | 8/2001 |
| EP | 0 809 324 | 8/2002 |
| EP | 1619747 | 1/2006 |
| FR | 1392013 | 2/1965 |
| WO | 1999/010950 | 3/1999 |

OTHER PUBLICATIONS

Siegel et al., "The Dielectric Filled Parabol: A New High Frequency integrated Receiver or Transmitter Front End", IEEE, 1989, pp. 1191-1194.
Westerlind, "Level Gauging by Radar", Advances in Instrumentation and Control, No. 44, Part 4, 12 sheets.

* cited by examiner

Primary Examiner—Douglas W. Owens
Assistant Examiner—Chuc Tran
(74) Attorney, Agent, or Firm—Fay Kaplun & Marcin, LLP (57) ABSTRACT

Reflections on the aerial system of a fill level radar result in reduced measuring quality at short range. Small echo signals at short range can thus disappear in the noise. According to one embodiment of the present invention a parabolic aerial for a fill level radar is stated, which parabolic aerial comprises a parabolic mirror, an exciter and a diffusion disc. The diffusion disc is used for laterally removing interfering electromagnetic waves that would otherwise be absorbed by the exciter. In this way the decay behaviour at short range can be reduced.

19 Claims, 6 Drawing Sheets

PARABOLIC AERIAL WITH A CONICAL DIFFUSION DISC FOR FILL LEVEL RADAR

REFERENCE TO RELATED APPLICATIONS

This application claims the benefit of the filing date of German Patent Application 10 2005 049 242.8 filed Oct. 14, 2005 and of U.S. Provisional Application No. 60/726,947 filed Oct. 14, 2005, the disclosure of which both is hereby incorporated herein by reference.

FIELD OF THE INVENTION

The present invention relates to fill level measuring. In particular the present invention relates to a parabolic aerial for a fill level radar, to a fill level radar comprising such a parabolic aerial, to the use of such a parabolic aerial for fill level measuring, and to a method for measuring a fill level by means of a parabolic aerial.

TECHNOLOGICAL BACKGROUND

Known fill level measuring devices comprise a parabolic aerial that transmits or receives microwaves so as to determine the fill level of a medium in a feed material container. In this setup the parabolic aerial of such a fill level measuring device is, for example, arranged within a container.

Hitherto known parabolic aerials and measuring devices that operate with radar waves or microwaves to determine the fill level of a medium in a container may be associated with undesired reflections, which among other things may be caused by the input coupling system and the aerial mirror itself. At short range, such undesired reflections result in at times considerable and undesirable reduction in the signal-to-noise ratio, which may result in the echo at short range disappearing in the noise. In particular in the measuring range below one meter this interfering noise is significant.

SUMMARY OF THE INVENTION

It may be desirable to provide for an improved fill level measuring at short range of a fill level radar.

According to an exemplary embodiment of the present invention a parabolic aerial for a fill level radar is stated, with the parabolic aerial comprising a parabolic mirror, an exciter for transmitting electromagnetic waves to the parabolic mirror, and a diffusion (i.e. scatter) disc for laterally removing an interfering fraction of the electromagnetic waves past the exciter.

According to this embodiment of the present invention the electromagnetic waves transmitted by the exciter (which moreover may also be used as a radiation receiver), which electromagnetic waves may for example be transmitted in the form of a transmit pulse, may only partly be concentrated (i.e. bundled) by the parabolic mirror and radiated to the feed material. The other part of the electromagnetic waves transmitted by the exciter may not be concentrated but instead removed laterally by the diffusion disc. In this way it may be possible to avoid undesirable reflections at the aerial system, in particular at the exciter. In this way the signal-to-noise ratio at short range may be improved, as may the quality and sensitivity of the measurements.

According to this embodiment of the present invention the diffusion disc may be arranged in the centre of the parabolic mirror.

In this way it may be possible to remove radiation near the centre, by reflection on the diffusion disc, from the central axis of the parabolic aerial so that said radiation does not impact on the exciter.

According to this embodiment of the present invention the shape of the diffusion disc is such that a beam of parallel rays that impinges the diffusion disc along an axis from the exciter may be diverted from the axis by a backscatter process at the diffusion disc.

For example the shape of the diffusion disc may be that of a pyramid or of a cone. However, other shapes may also be possible, which shapes for example comprise a surface that may be inclined in relation to the axis, which surface makes it possible to divert the interfering fraction of the electromagnetic waves (which fraction impinges on the diffusion disc).

According to a further exemplary embodiment of the present invention the diffusion disc is conical in shape and comprises a rotational axis so that a beam of parallel radiation that impinges the diffusion disc in the direction of the rotational axis may be diverted from the rotational axis by a backscatter process at the diffusion disc.

The conical shape may for example make it possible for the parallel radiation, which impinges on the diffusion disc, to be diverted in whole at the same angle in relation to the rotational axis of the parabolic aerial. Such a conical diffusion disc may be easy to manufacture. In this way production costs and manufacturing costs may be reduced.

According to a further exemplary embodiment of the present invention the diffusion disc comprises a material which at least partly absorbs part of the electromagnetic waves.

In this way the fraction of scattered-away radiation may be reduced because part of the undesirable radiation may be absorbed already within the diffusion disc.

According to a further exemplary embodiment of the present invention the parabolic aerial comprises a collar which may be arranged on the parabolic mirror.

According to a further exemplary embodiment of the present invention the parabolic mirror and the collar take up an interior space that is covered by a radome.

For example, the exciter may be arranged within the interior space taken up in this way.

In this way undesired reflections may further be prevented.

For example, the collar, at least on its inside, comprises a material that absorbs the radiation of the exciter.

According to a further exemplary embodiment of the present invention the interior space of the parabolic aerial may be filled with a dielectric material.

Furthermore, a flushing device for flushing the exciter with a flushing agent may be provided.

In this way, dirt build-up on the exciter, which dirt build-up may for example be caused by feed material dust or by liquid precipitation, may be removed or prevented from occurring.

The quality of measuring may thus be improved in two ways. Firstly it may be ensured that the exciter may always be clean and free of any dirt build-up. Secondly it may be ensured that interfering radiation may be diffused away from the exciter and may thus no longer be fed to the measuring- and evaluation electronics.

In this arrangement, for example, air or an inert gas or water may be provided as a flushing agent, which may be injected or blown from the flushing device to the exciter by way of a flushing duct and a flushing outlet.

Depending on the requirements, cleaning agents may also be added. Furthermore, the flushing agent may be hot so as to improve the cleaning effect. If need be the flushing agent may be sprayed onto the exciter at high pressure. Of course, the use of additional flushing agents may also be possible, for example reactive mixtures that may further improve the cleaning effect.

According to an exemplary embodiment of the present invention the flushing outlet may be located in the diffusion disc; it may be designed in the shape of a multitude of boreholes in the diffusion disc, wherein the boreholes may be connected to the flushing duct.

According to a further exemplary embodiment of the present invention the flushing device comprises a flushing connection, wherein the flushing connection is designed for connecting the flushing device to a flushing agent reservoir.

This may ensure that there is always a sufficient quantity of flushing agent for cleaning or for preventing dirt deposits at the aerial feed (exciter).

According to a further exemplary embodiment of the present invention the parabolic aerial comprises an aerial input coupling, wherein the flushing connection comprises a thread for screwing into the aerial input coupling.

In this way the flushing connection may be attached in a simple manner to the aerial input coupling.

According to a further exemplary embodiment of the present invention the flushing device comprises a nonreturn valve, wherein the nonreturn valve is designed to prevent any return flow of material.

In this way materials contained inside the feed material container may be prevented from flowing outward by way of the flushing device.

To this effect, for example, the nonreturn valve comprises a spring element and a ball which opens the flushing duct only from a defined operating pressure of, for example, 0.5 bar (in forward direction). If the pressure of the flushing agent drops below the set threshold (for example 0.5 bar) the spring pushes the ball against the flushing duct so that said flushing duct becomes blocked. Of course it may also be possible to set some other threshold pressure.

According to an exemplary embodiment of the present invention the flushing device is designed to provide explosion protection.

This nonreturn valve may for example prevent any exchange of materials between the interior of the container and the exterior.

According to a further exemplary embodiment of the present invention the exciter comprises a Teflon cone.

According to a further exemplary embodiment of the present invention a fill level radar is stated which comprises a parabolic aerial as described above.

According to a further exemplary embodiment of the present invention the use of such a parabolic aerial for fill level measuring is stated.

Furthermore, a method for measuring a fill level with such a parabolic aerial is stated, wherein the method comprises the transmission of electromagnetic waves to a parabolic mirror by means of an exciter, the concentration of the electromagnetic waves by means of the parabolic mirror, and the lateral removal of part of the electromagnetic waves past the exciter by means of a diffusion disc.

In this way a method may be provided by means of which the fill level in a tank may be determined, wherein a reduction in the signal-to-noise ratio at short range takes place by laterally removing interfering electromagnetic waves.

Further exemplary embodiments of the invention are disclosed in the subordinate claims.

Below, exemplary embodiments of the present invention are described with reference to the figures.

DETAILED DESCRIPTION OF EXEMPLARY EMBODIMENTS

In the following description of the figures, the same reference characters are used for identical or similar elements.

Figure 1:
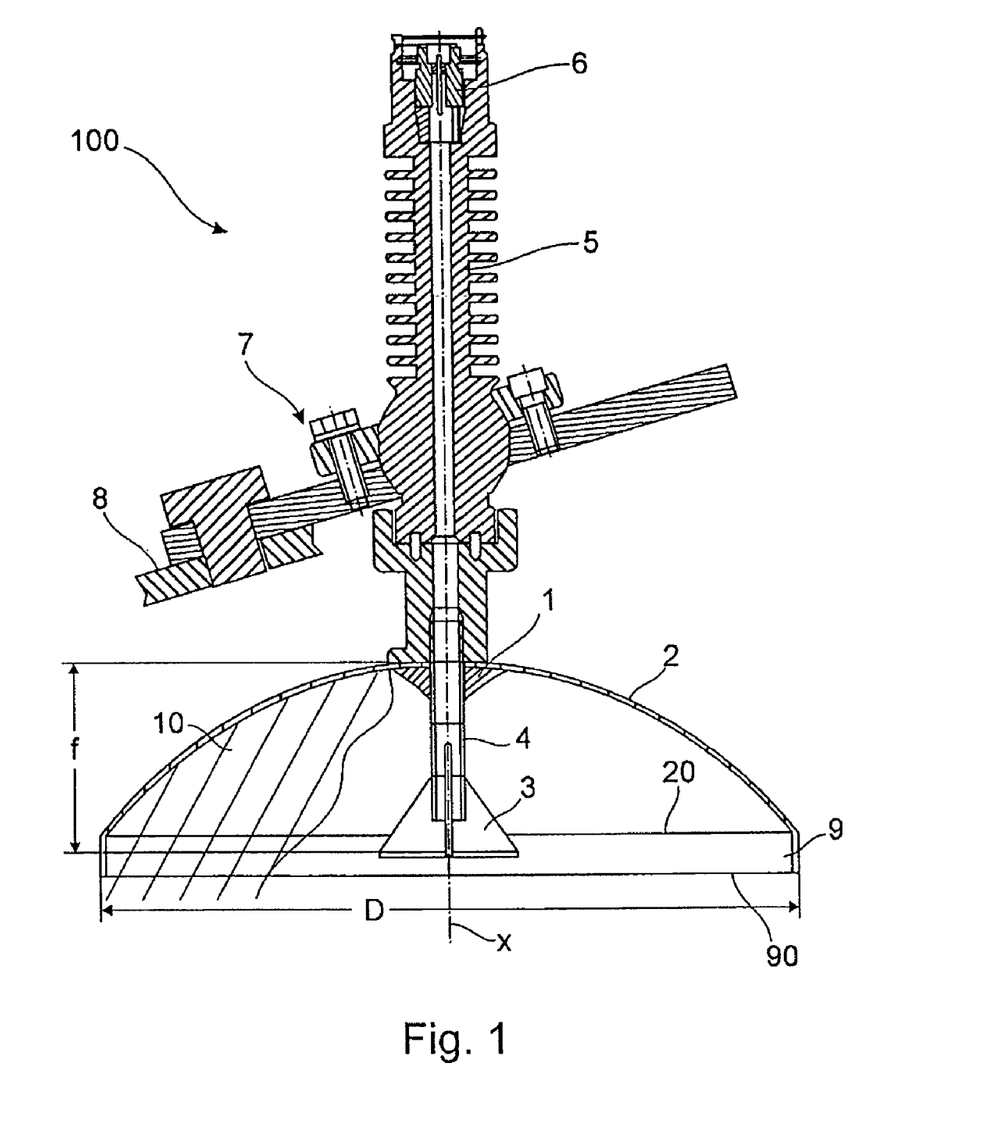
FIG. 1 shows a section view of a parabolic aerial according to exemplary embodiment of the present invention.

FIG. 1 shows a diagrammatic section view of a parabolic aerial according to one embodiment of the present invention. As shown in FIG. 1 the parabolic aerial 100 essentially comprises a parabolic mirror 2 with a diffusion disc 1 and an exciter/receiver 3. In this arrangement the parabolic mirror 2 comprises a circumferential rim 20 of the parabolic mirror. The rim 20 of the parabolic mirror undergoes a transition to an additional collar 9 with a collar rim 90 on the outside. In this arrangement the wall of the collar 9 extends so as to be approximately axially parallel in relation to a central parabolic mirror axis X of the parabolic mirror 2.

Moreover, the parabolic aerial 100 comprises the exciter and/or receiver 3 that is arranged on the parabolic mirror axis X and is arranged at a distance from the rear wall of the parabolic mirror 2 with a wave-guiding element, for example an aerial tube or a hollow conductor 4. At the rear, the hollow conductor 4 undergoes a transition to a waveguide arrangement comprising at least one waveguide 5 at whose rear end section a connection 6 for a transmit/receive device is arranged. The transmit/receive device comprises electronics and components for generating an electromagnetic wave, in particular a radar wave or microwave.

The connection 6 conveys (i.e. transmits) the electromagnetic wave generated in this way through the waveguide 5 and the hollow conductor 4 to the exciter 3. From the exciter 3 the wave is radiated in the direction of the parabolic mirror and is reflected, by this parabolic mirror, to the parabolic mirror axis X in axis-parallel direction.

The electromagnetic wave transmitted in this way is reflected by the feed material and, as a rule, is at least partly received by the parabolic mirror 2. The wall of the parabolic mirror 2 reflects the reflected-back wave fractions to the receiver 3 of the exciter/receiver arrangement 3. From the receiver 3 the absorbed wave is transmitted by way of the hollow conductor 4 and the waveguide 5 via the connection 6 to the receive device of the transmit/receive device and is absorbed by said receive device. The electronics of the transmit/receive device or of some other downstream evaluation device determines the time difference between transmitting the electromagnetic wave and receiving the electromagnetic wave reflected by the feed material or by the surface. From this the fill level of the feed material in a container may be determined.

In order to attach the parabolic aerial 100 in a container wall, in particular in a container flange 8, the region of the waveguide 5 of the rear components comprises an attachment device 7, e.g. comprising a flange. The exciter/receive element 3 (which may be one and the same element) is located inside the arrangement comprising the parabolic mirror 2 and the collar 9 so that the exciter/receive element 3 is arranged partly within the rim 20 of the parabolic mirror and partly outside the rim 20 of the parabolic mirror. Part of the exciter/receive element 3 protrudes into the region of the parabolic mirror 2, while another part protrudes from the region of the parabolic mirror 2 and into the region of the collar 9. In the embodiment shown in FIG. 1 the exciter/receive element 3 is arranged so as to be completely within the interior space defined by the collar rim 9 and the parabolic mirror 2.

In this way the exciter/receive element 3 may be mechanically protected. Furthermore, in the case of full illumination, side lobes and back lobes, which are undesirable lobes that result for example from irradiation of the parabolic mirror 2, may be prevented as far as possible.

According to an exemplary embodiment of the present invention the ratio of focal length f to diameter D of the parabolic aerial is 0.27. However, quite different values, either larger or smaller, may be also possible.

Furthermore, an integral one-piece design comprising the parabolic mirror 2 and the collar 9 may be possible. Optionally, the collar 9 may be made from the same material as the parabolic mirror 2 or it may be made from a different material. In particular an inside coating or a complete collar material to absorb electromagnetic waves that impinge on the interior wall of the collar 9 may be possible.

In order to further reduce interfering reflections and to minimise or reduce the decay behaviour at short range, a diffusion disc 1 may be arranged in the centre of the parabolic mirror 2, which diffusion disc 1 may laterally remove electromagnetic waves that are transmitted by the exciter 3 so that the reflected waves can no longer impinge on the exciter 3. As shown in FIG. 1 the shape of the diffusion disc 1 is such that radiation that emanates from the exciter 3 and impinges on the diffusion disc 1 is reflected away from the rotational axis X. In this way the decay behaviour at short range may be significantly reduced. The shape of the diffusion disc 1 need not be conical; of importance may merely be that it is inclined in relation to the plane perpendicular to the rotational axis X so that axis-parallel radiation, too, is diffused away. As an alternative, or in addition, the diffusion disc 1 may comprise a radiation-absorbing material so that impinging radiation may be at least partly absorbed.

Since by way of the diffusion disc 1, according to the invention, electromagnetic waves—which otherwise after transmission from the exciter/receiver 3 and after reflection from the parabolic mirror 2 would have been directly absorbed again by the exciter/receiver 3—are now diffused away, the danger of overdriving the receiving electronics may be reduced. Since the undesirable interfering radiation is diffused away or is absorbed by the diffusion disc 1 (rather than being detected), it may thus for example be possible to increase the radiation output without there being any danger of overdriving the receiving electronics.

Overall, the interfering signals may be reduced at short measuring range, which may result in improved measuring results.

Furthermore, the diffusion disc 1 comprises flushing outlets (not shown in FIG. 1) through which a flushing agent for cleaning the exciter/receiver 3 may be sprayed, dripped, blown or otherwise conveyed in the direction of the exciter/receiver 3.

Figure 4:
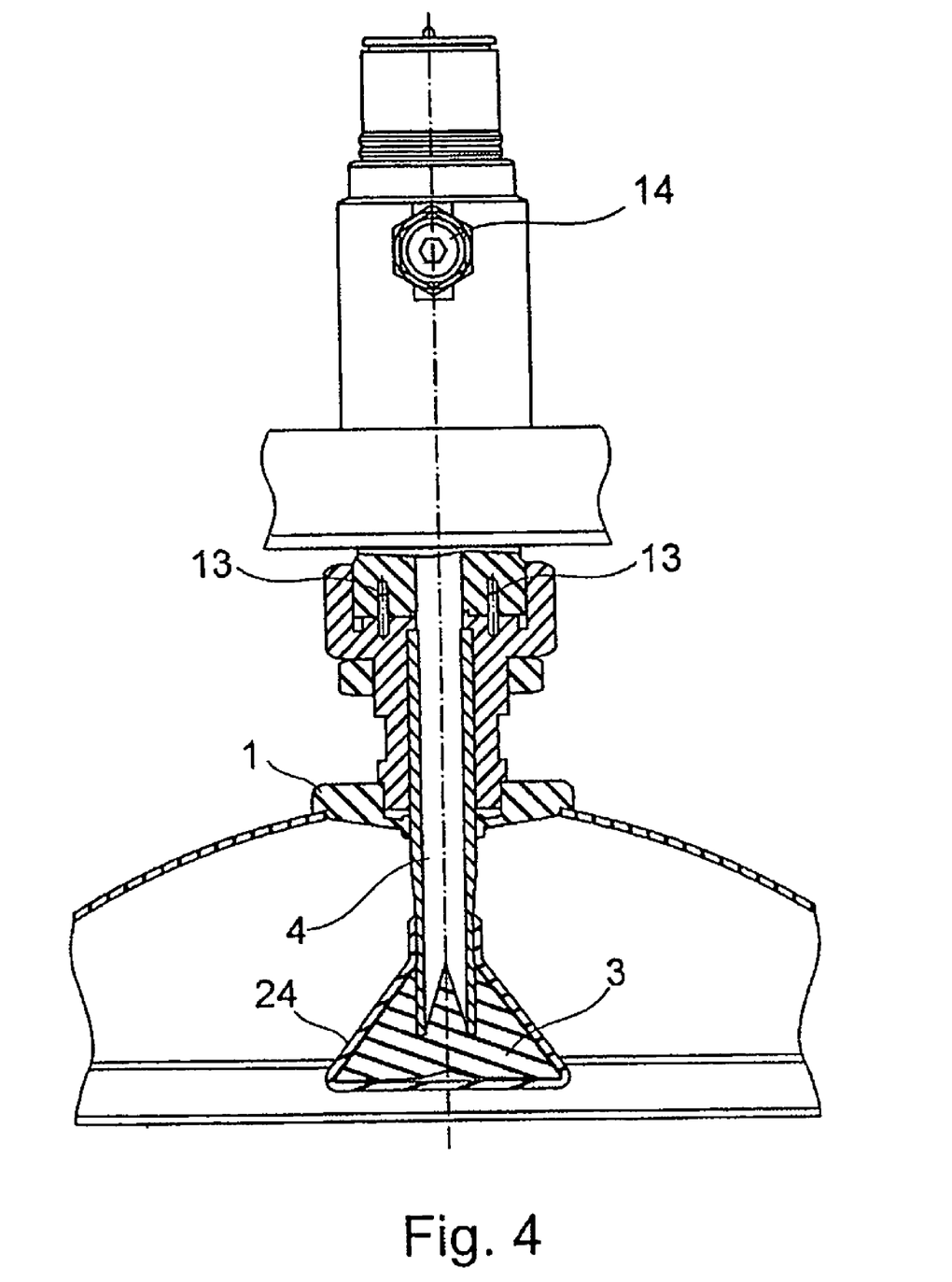
FIG. 4 shows a diagrammatic section view of a parabolic aerial according to a further exemplary embodiment of the present invention.

If required, the complete aerial system 100 may be enveloped in a simple plane protective cover, a so-called radome (see reference character 24 in FIG. 4). The material used for this may for example be polytetrafluoroethylene (PTFE). Similarly, a PTFE disc or if need be a curved cover for covering the parabolic aerial may be provided.

Furthermore, it may be possible to fill the interior of the parabolic aerial with a dielectric material 10. The value of the dielectric constant of the dielectric material is for example less than 3. For example a foamed low-loss material may be used, e.g. Eccostock-Lok by Emerson & Cuming, with a dielectric constant of 1.7.

Figure 2:
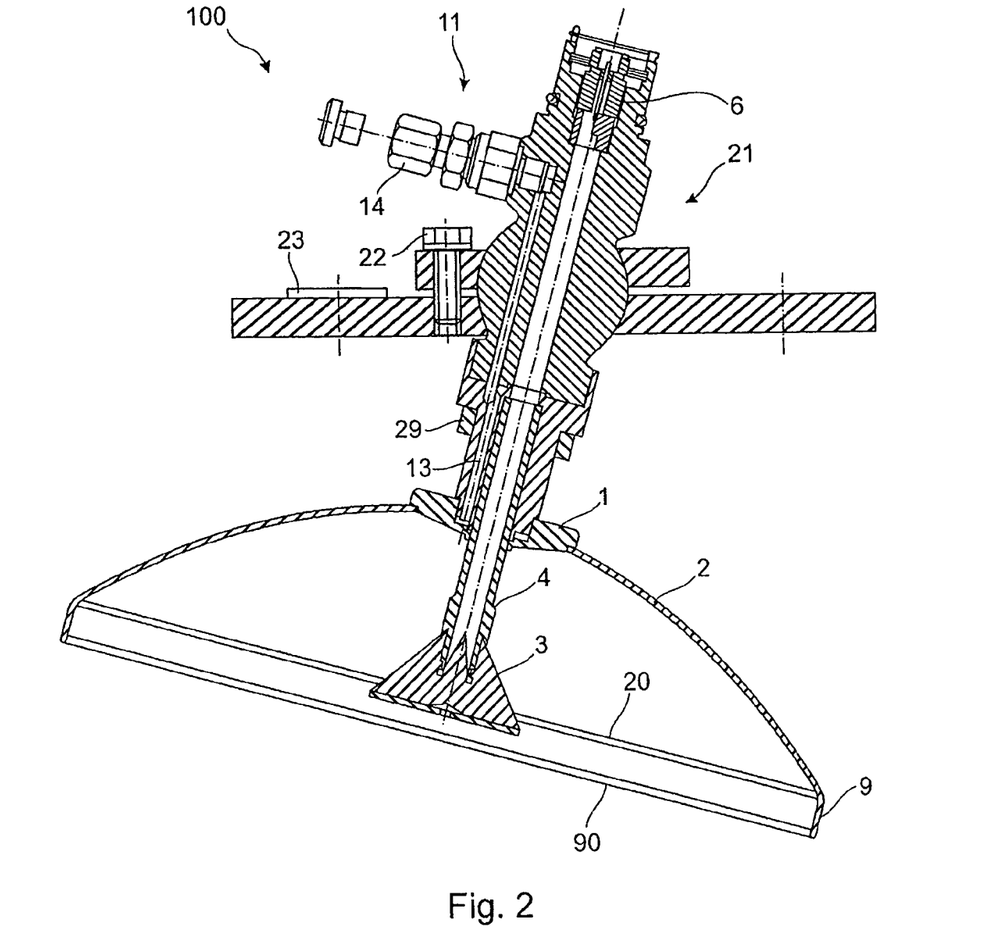
FIG. 2 shows a section view of a further parabolic aerial according to another exemplary embodiment of the present invention.

FIG. 2 shows a diagrammatic section view of a parabolic aerial according to another embodiment of the invention. The parabolic aerial shown in FIG. 2 essentially corresponds to the parabolic aerial shown in FIG. 1. The diffusion disc 1 is conical in shape; it thus comprises a non-curved surface that faces the impinging electromagnetic radiation. Furthermore, attachment elements 22, 23 are provided in order to hold the aerial arrangement 100 or to attach it to a feed material container cover.

The flushing device 11 comprises a flushing connection 14 that comprises a thread in order to be attached in the aerial input coupling 21. The flushing connection 14 is connected to several flushing outlets 12, 25, 26, 27 by way of the flushing duct 13 (see FIGS. 5 and 7).

Figure 3:
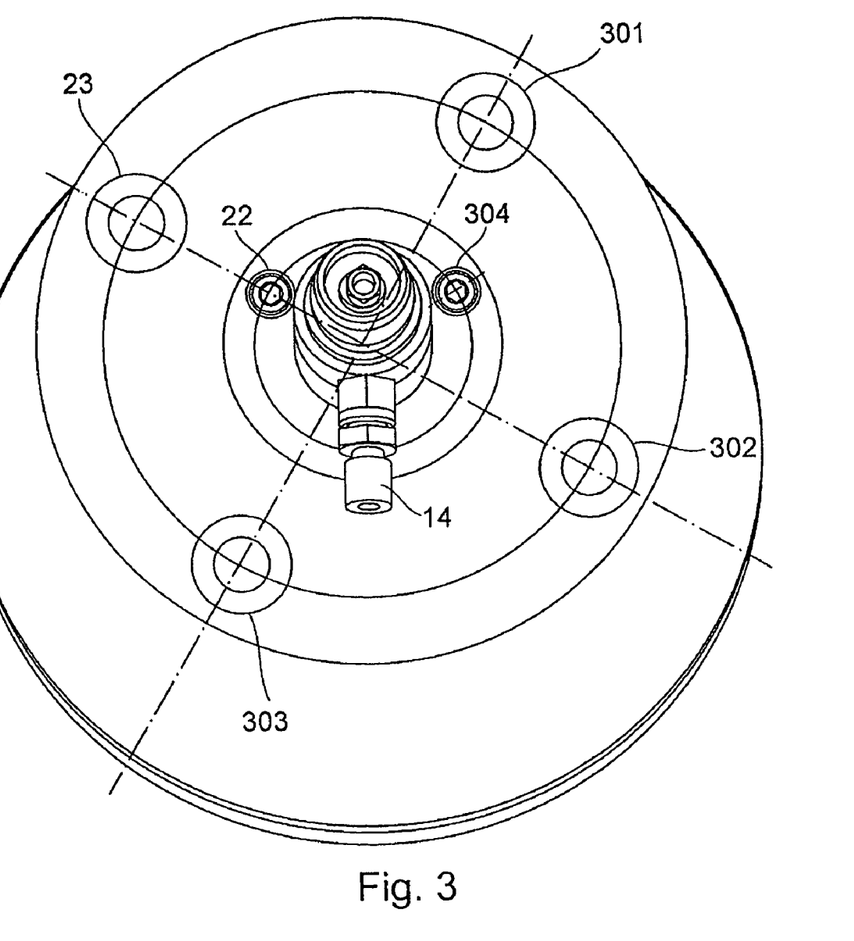
FIG. 3 shows a perspective top view of the parabolic aerial shown in FIG. 2.

FIG. 3 shows a perspective top view of the parabolic aerial shown in FIG. 2. In particular, the arrangement of the attachment elements 22, 23 and of further attachment elements 301 to 304 is shown.

FIG. 4 shows a diagrammatic cross-sectional view of an aerial arrangement according to a further embodiment of the present invention. As shown in FIG. 4 the exciter/receiver 3 and the hollow conductor 4 are enveloped by a radome 24. This is a simple plane protective cover that is used to protect the aerial system.

Figure 5:
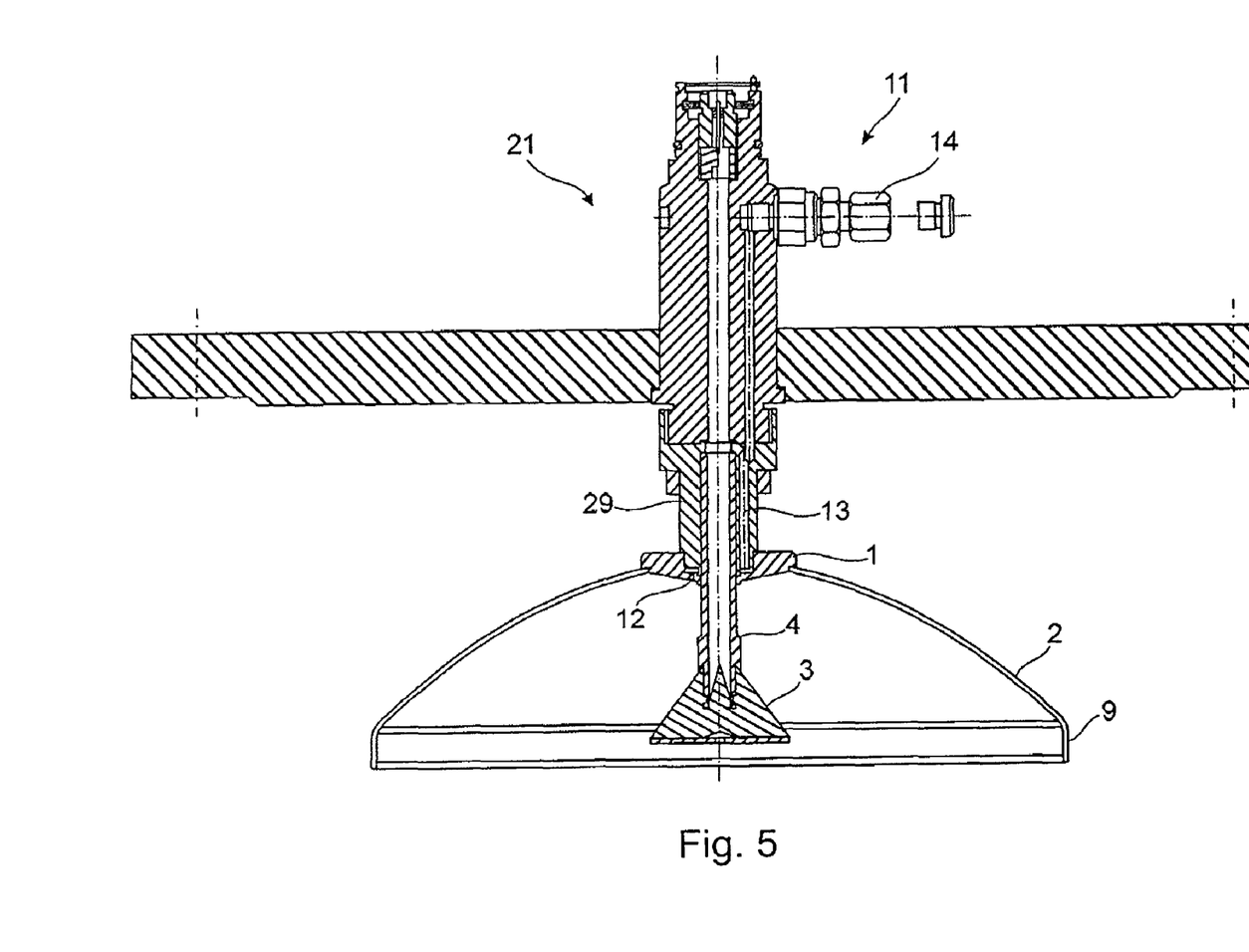
FIG. 5 shows a diagrammatic section view of a parabolic aerial according to a further exemplary embodiment of the present invention.

FIG. 5 shows a further diagrammatic view of a further embodiment of the present invention. As shown in FIG. 5 the aerial input coupling 21 has been placed onto the aerial body 29. In the interior of the aerial body 29 and of the aerial input coupling 21 there are flushing ducts 13 that convey a flushing agent from the flushing connection 14 to the outlet 12. The outlet 12, which is designed in the shape of a borehole, is located in the diffusion disc 1 that is used for diffusing undesirable radiation. The flushing connection 12 is used for cleaning the exciter/receiver 3 by means of a jet of flushing agent, in other words for keeping the exciter/receiver 3 clean.

Figure 6:
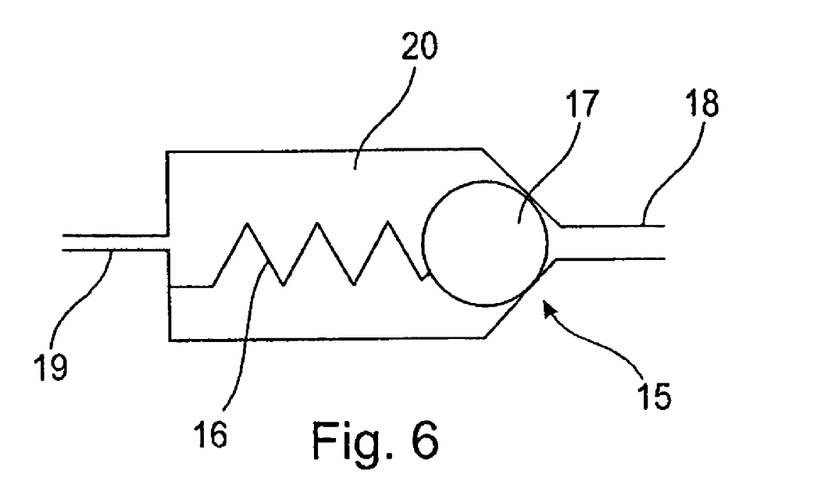
FIG. 6 shows a diagrammatic section view of a nonreturn valve for a flushing device connected to the diffusion disc, according to another exemplary embodiment of the present invention.

FIG. 6 shows a diagrammatic cross-sectional view of a nonreturn valve 15 to prevent any reverse material flow. As shown in FIG. 6 the nonreturn valve 15 comprises a ball 17 and a spring 16 that are accommodated in a housing 20. In this arrangement the spring 16 pushes the ball 17 against an inlet line 18 that is connected to a flushing agent reservoir. As soon as the pressure of the flushing agent that flows from the reservoir to the inlet line 18 and pushes against the ball 17 is sufficient (typically in excess of 0.5 bar) the spring 16 is compressed and the ball 17 provides access to the housing 20 so that the flushing agent can flow through the housing to the outlet line 19. In this arrangement the outlet line 19 is connected to the outlet 12. However, when the positive pressure of the flushing agent falls below a pre-set threshold value, the spring 16 presses the ball 17 against the inlet of the inlet line 18 so that the inlet line 18 is blocked off so as to provide a seal. Further materials conveyance is thus stopped. In addition, for example, no spark may overcome the nonreturn valve 15. In this way explosion protection is provided.

Figure 7:
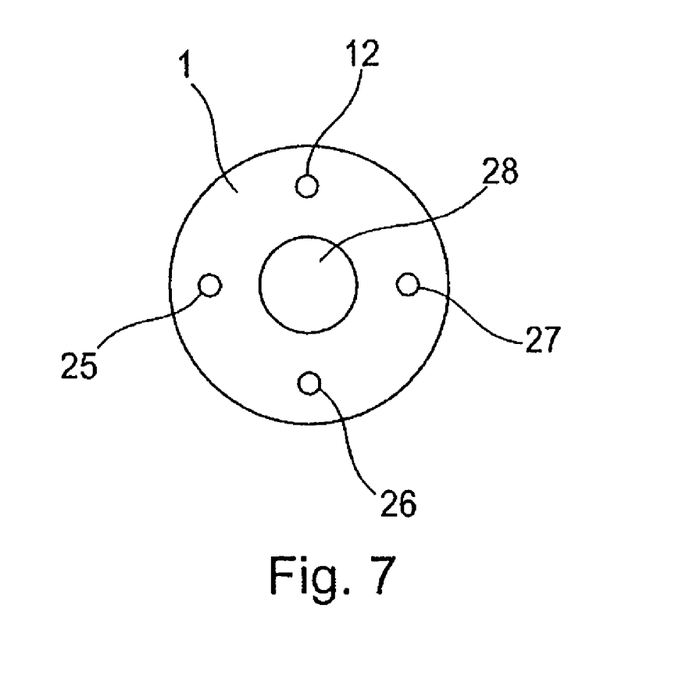
FIG. 7 shows a diagrammatic view of a diffusion disc according to another exemplary embodiment of the present invention.

FIG. 7 shows a diagrammatic top view of a diffusion disc 1. In this arrangement the diffusion disc 1 comprises several flushing outlets 12, 25, 26, 27 through which the flushing agent may be dispensed for flushing the exciter/receiver 3. Furthermore, the diffusion disc 1 comprises a leadthrough 28 for a hollow conductor to feed the exciter/receiver 3. In this arrangement the diffusion disc 1 is conical in shape so that electromagnetic waves that impinge the diffusion disc 1 perpendicular in relation to the drawing plane are diffused in a direction that differs from that of the impingement axis. It may of course also be possible to provide more than four, or fewer than four, flushing outlets.

The diffusion disc 1 may for example be made as a separate component and during installation is attached to the parabolic mirror 2 or, for example, also to the hollow conductor 4. Attachment can for example be by adhesion, welding, riveting, screwing or press-fitting. Of course, the parabolic mirror 2 and the diffusion disc 1 may also be made in one piece. Furthermore, it may be possible for the diffusion disc 1 and the hollow conductor 4 to be made in one piece.

In addition it should be pointed out that "comprising" does not exclude other elements or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

The invention claimed is:

1. A parabolic aerial for a fill level radar, with the parabolic aerial, comprising:
    a parabolic mirror;
    an exciter for transmitting electromagnetic waves to the parabolic mirror; and
    a diffusion disc for laterally removing an interfering fraction of the electromagnetic waves past the exciter;
    wherein the parabolic mirror is designed to concentrate the electromagnetic waves;
    wherein the diffusion disc is arranged in the centre of the parabolic mirror;
    wherein the shape of the diffusion disc is such that a beam of parallel radiation that impinges the diffusion disc along an axis from the exciter is diverted from the axis by a backscatter process at the diffusion disc, and
    wherein the shape of the diffusion disc is such that electromagnetic waves, which after transmission from the exciter and reflection from the parabolic mirror, are diffused away from the exciter.

2. The parabolic aerial according to claim 1,
    wherein the diffusion disc is conical in shape and comprises a rotational axis so that a beam of parallel radiation that impinges on the diffusion disc in the direction of the rotational axis is diverted from the rotational axis by a backscatter process at the diffusion disc.

3. The parabolic aerial according to claim 1,
    wherein the diffusion disc comprises a material which at least partly absorbs the electromagnetic waves.

4. The parabolic aerial according to claim 1,
    further comprising a collar that is arranged on the parabolic mirror.

5. The parabolic aerial according to claim 4,
    wherein the exciter and the hollow conductor take up an interior space that is covered by a radome.

6. The parabolic aerial according to claim 1,
    wherein the interior space of the parabolic aerial is filled with a dielectric material.

7. The parabolic aerial according to claim 1, with the parabolic aerial further comprising:
    a flushing device for flushing the exciter with a flushing agent.

8. The parabolic aerial according to claim 7,
    wherein the flushing device comprises a flushing duct and a flushing outlet;
    wherein flushing duct is designed to convey the flushing agent to the flushing outlet; and
    wherein the flushing outlet is designed to let the flushing agent out in the direction of the exciter.

9. The parabolic aerial according to claim 7,
    wherein the flushing outlet is located in the diffusion disc.

10. The parabolic aerial according to claim 7,
    wherein the flushing outlet is designed in the shape of a multitude of boreholes in the diffusion disc, which boreholes are connected to the flushing duct.

11. The parabolic aerial according to claim 7,
    wherein the flushing device comprises a flushing connection; and
    wherein the flushing connection is designed to connect the flushing device to a flushing agent reservoir.

12. The parabolic aerial according to claim 7,
    wherein the parabolic aerial comprises an input coupling; and
    wherein the flushing connection comprises a thread for screwing into the aerial input coupling.

13. The parabolic aerial according to claim 7,
    wherein the flushing device comprises a nonreturn valve; and
    wherein the nonreturn valve is designed to prevent any return flow of material.

14. The parabolic aerial according to claim 7,
    wherein the flushing device is designed to provide explosion protection.

15. The parabolic aerial according to claim 7,
    wherein the nonreturn valve comprises a spring element and a ball.

16. The parabolic aerial according to claim 1,
    wherein the exciter comprises a Teflon cone.

17. A fill level radar comprising a parabolic aerial according to claim 1.

18. The use of a parabolic aerial according to claim 1 for fill level measuring.

19. A method for measuring a fill level with a parabolic aerial, comprising the steps of:
    transmitting electromagnetic waves to a parabolic mirror by means of an exciter;
    concentrating the electromagnetic waves by means of the parabolic mirror; and
    laterally removing an interfering fraction of the electromagnetic waves past the exciter by means of a diffusion disc,
    wherein the shape of the diffusion disc is such that electromagnetic waves, which after transmission from the exciter and reflection from the parabolic mirror, are diffused away from the exciter; wherein the diffusion disc is arranged in the centre of the parabolic mirror; wherein the diffusion disc is conical in shape and comprises a rotational axis so that a beam of parallel radiation that impinges on the diffusion disc in the direction of the rotational axis is diverted from the rotational axis by a backscatter process at the diffusion disc.

* * * * *